(12) United States Patent
Silverman

(10) Patent No.: US 6,546,582 B2
(45) Date of Patent: Apr. 15, 2003

(54) DRAIN CLEANING MACHINE AND ADJUSTABLE COLLET CHUCK MECHANISM THEREFOR

(76) Inventor: Lee H. Silverman, 2235 Harmain Rd., Pittsburgh, PA (US) 15235

( * ) Notice: Subject to any disclaimer, the term of this patent is extended or adjusted under 35 U.S.C. 154(b) by 5 days.

(21) Appl. No.: 09/883,608

(22) Filed: Jun. 18, 2001

(65) Prior Publication Data

US 2002/0189038 A1 Dec. 19, 2002

(51) Int. Cl.[7] ............................................. B08B 9/02
(52) U.S. Cl. ............................ 15/104.33; 254/134.3 FT
(58) Field of Search ........................ 15/104.31, 104.33; 254/134.3 FT

(56) References Cited

U.S. PATENT DOCUMENTS

| | | | | |
|---|---|---|---|---|
| 2,603,495 A | * | 7/1952 | Hermanson | |
| 3,093,854 A | * | 6/1963 | Silverman | |
| 4,447,926 A | * | 5/1984 | Rothenberger | |
| 5,056,178 A | * | 10/1991 | Levine | |
| 5,603,136 A | * | 2/1997 | Truschler | |
| 5,657,505 A | | 8/1997 | Gallagher et al. | |

* cited by examiner

Primary Examiner—Terrence R. Till
(74) Attorney, Agent, or Firm—Metz Lewis LLC; Barry I. Friedman; Philip E. Levy

(57) ABSTRACT

A drain cleaning machine includes a housing and a cage member that is axially displaceable along and rotatable about the longitudinal axis of the housing. The cage member has an axial bore and is adapted to receive a cable. A plurality of jaw elements are inserted into and displaceable within the cage member. A rotatable cone member surrounds the first end of the cage member and is adapted to engage the jaw elements and displace the jaw elements radially inward within the cage member as it is axially displaced along the longitudinal axis. A motor is coupled to the cone member for rotating the cone member, wherein rotation of the cone member causes rotation of the cage member. The jaw elements are adapted to engage and grip the cable such that rotation of the cage member causes rotation of the cable about the longitudinal axis.

22 Claims, 8 Drawing Sheets

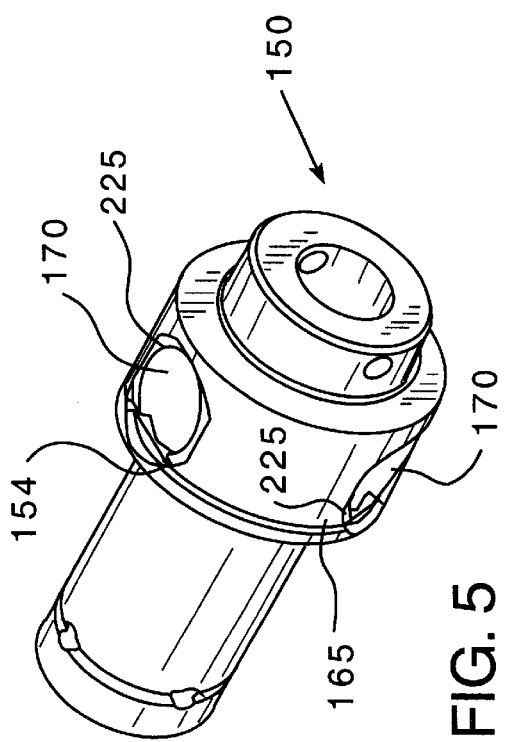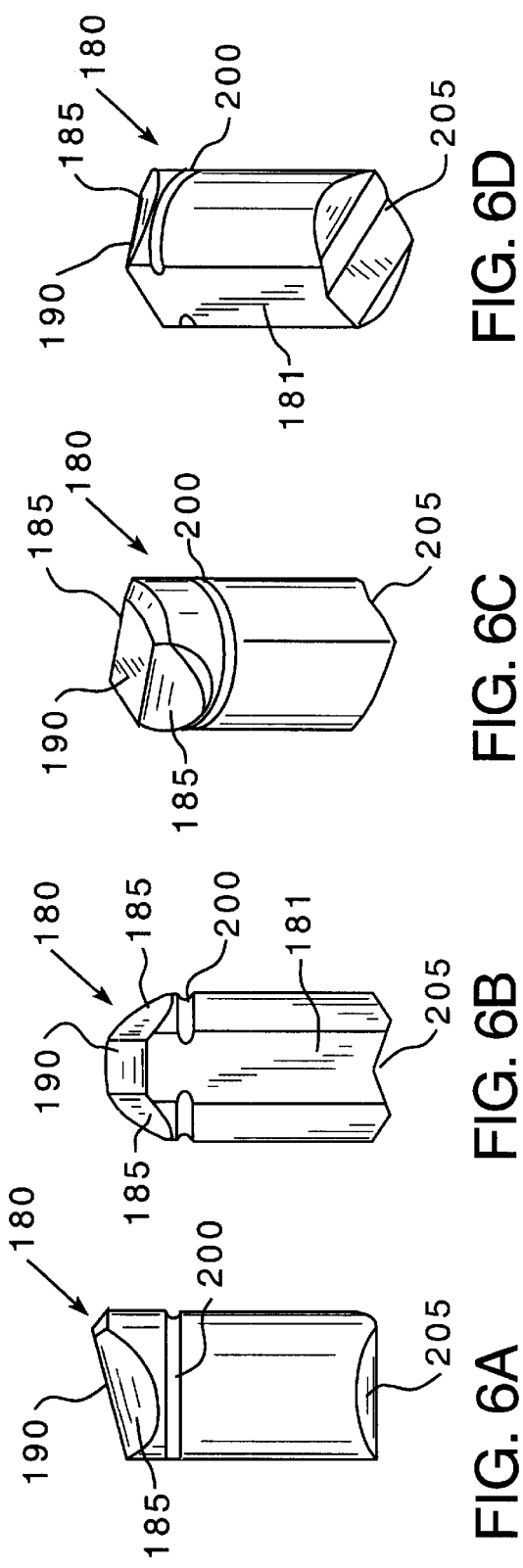

DRAIN CLEANING MACHINE AND ADJUSTABLE COLLET CHUCK MECHANISM THEREFOR

FIELD OF THE INVENTION

The present invention relates to a drain cleaning machine and, more particularly, to a drain cleaning machine having an adjustable collet chuck mechanism for engaging a drain cleaning cable.

BACKGROUND AND DESCRIPTION OF THE PRIOR ART

In one type of well known portable drain cleaning machine in wide use today, a housing structure supports a coaxial arrangement of shaft components through which a drain cleaning cable, which may comprise a plurality of interconnected sectional cables, is manually fed. The housing structure includes a clutching arrangement for selectively engaging and rotating the drain cleaning cable during a drain cleaning operation. The clutching arrangement may take one of many well known forms. For example, the clutching arrangement may include radially expandable and contractable clutch elements located between and coaxial with clutch actuating components. In such an arrangement, the clutch actuating components are axially displaceable toward and away from one another to contract and expand, respectively, the clutch elements relative to the drain cleaning cable. Typically, one of the clutch actuating components is axially fixed and the other is axially displaceable toward and away from the fixed component by means of a manually operable lever arrangement. The clutch actuating components and the clutch elements are adapted to be rotated about a feed axis of the drain cleaning cable by a drive motor and a drive coupling arrangement between the motor and one of the clutch actuating components.

In use, the drain cleaning cable is manually inserted through the apparatus and into a drain to be cleaned. If the motor is operating, the clutch elements and the clutch actuating components rotate relative to the drain cleaning cable. The drain cleaning cable may be in the form of a single long piece of cable that can be manually inserted through the apparatus until an obstruction in the drain is encountered. Alternatively, the drain cleaning cable may comprise a number of smaller sections of cable that can be successively attached to one another and inserted through the apparatus until an obstruction is encountered. In either case, when an obstruction is encountered, the operating lever may then be displaced relative to the housing so as to cause the clutch elements to engage and rotate the drain cleaning cable and clear the obstruction. The operating lever may then be released to disengage the clutch from the drain cleaning cable so that the operator can feed the drain cleaning cable further into the drain.

Gallagher, et al., U.S. Pat. No. 5,657,505, describes one such prior art drain cleaning machine that includes a frame and a housing that supports a rotatable shaft. The shaft is axially displaceable by means of a lever arrangement. The shaft supports a first clutch actuating member such that the first clutch actuating member is rotatable and axially displaceable with the shaft. A second clutch actuating member coaxial with the first clutch actuating member is rotatably supported in the housing. A radially expandable and contractable collet or clutch unit is captured between the first and second clutch actuating members for engaging and disengaging the drain cleaning cable. In particular, the first and second clutch actuating members each include conical surfaces that cause the collet or clutch unit to be contracted when the first clutch actuating member is axially displaced toward the second clutch actuating member and expanded when the first clutch actuating member is axially displaced away from the second clutch actuating member. The collet or clutch unit comprises three circumferentially adjacent arcurate clutch segments, each having conically contoured axially opposite end surfaces that slideably engage the conical surfaces of the first and second clutch actuating members. The second clutch actuating member is supported so as to be axially adjustable between a maximum and a minimum spacing relative to the first clutch actuating member, thereby enabling the collet or clutch unit to accommodate drain cleaning cables having different diameters.

SUMMARY OF THE INVENTION

The present invention relates to a drain cleaning machine including a housing adapted to receive a cable along the longitudinal axis thereof and a cage member having a first end having an axial bore therethrough and a plurality of holes located radially about a circumference thereof. The holes extend through an outer wall of the cage member. The second end of the cage member is inserted within the housing such that the axial bore corresponds with the longitudinal axis. The cage member is axially displaceable along and rotatable about the longitudinal axis and is adapted to receive the cable therethrough. Also included in the machine is a plurality of jaw elements, each of the jaw elements being inserted into and displaceable within one of the holes. A cone member surrounds the first end of the cage member. The cone member is rotatable about the longitudinal axis. The cone member is adapted to engage each of the jaw elements and displace the jaw elements radially inward within the holes when the cage member is axially displaced along the longitudinal axis. A motor is coupled to the cone member for rotating the cone member, wherein rotation of the cone member causes rotation of the cage member. The jaw elements are adapted to engage and grip the cable such that rotation of the cage members causes rotation of the cable about the longitudinal axis.

The cone member may include a plurality of first engagement surfaces and a plurality of second engagement surfaces and the second engagement surfaces by rotating the cage member with respect to the cone member. In addition, each of the jaw elements may have a sloped top surface that engages corresponding ones of the first engagement surfaces when the jaw elements are aligned with the first engagement surfaces and engages corresponding ones of the second engagement surfaces when the jaw elements are aligned with the second engagement surfaces, wherein the first engagement surfaces and the second engagement surfaces have an inward cant. The first engagement surfaces may each comprise a first arcuate section forming a part of a first circular section having a first radius and the second engagement surfaces may each comprise a second arcuate section forming a part of a second circular section having a second radius. The holes may be spaced equally about the circumference of said cage member, in which case the first engagement surfaces are spaced equally about a perimeter of the cone member and the second engagement surfaces are spaced equally about the perimeter of the cone member.

In one embodiment, the top surfaces of the jaw elements engage corresponding ones of the first engagement surfaces when the jaw elements are aligned with the first engagement surfaces and engage corresponding ones of the second engagement surfaces when the jaw elements are aligned with the second engagement surfaces. In this embodiment, the jaw elements are displaced a first distance within the axial bore of the cage member when engaging the first engagement surfaces and a second distance within the axial bore of the cage member when engaging the second engagement surfaces.

BRIEF DESCRIPTION OF THE DRAWINGS

Further features and advantages of the present invention will be apparent upon consideration of the following detailed description of the present invention, taken in conjunction with the following drawings, in which like reference characters refer to like parts, and in which:

FIG. 5 is an isometric view of a cage forming a part of the drain cleaning machine according to the present invention;

FIGS. 6A, 6B, 6C and 6D are side elevation, back elevation, top-front isometric and bottom-back isometric views of a jaw element forming a part of the drain cleaning machine according to the present invention;

DESCRIPTION OF THE PREFERRED EMBODIMENTS

Figure 1:
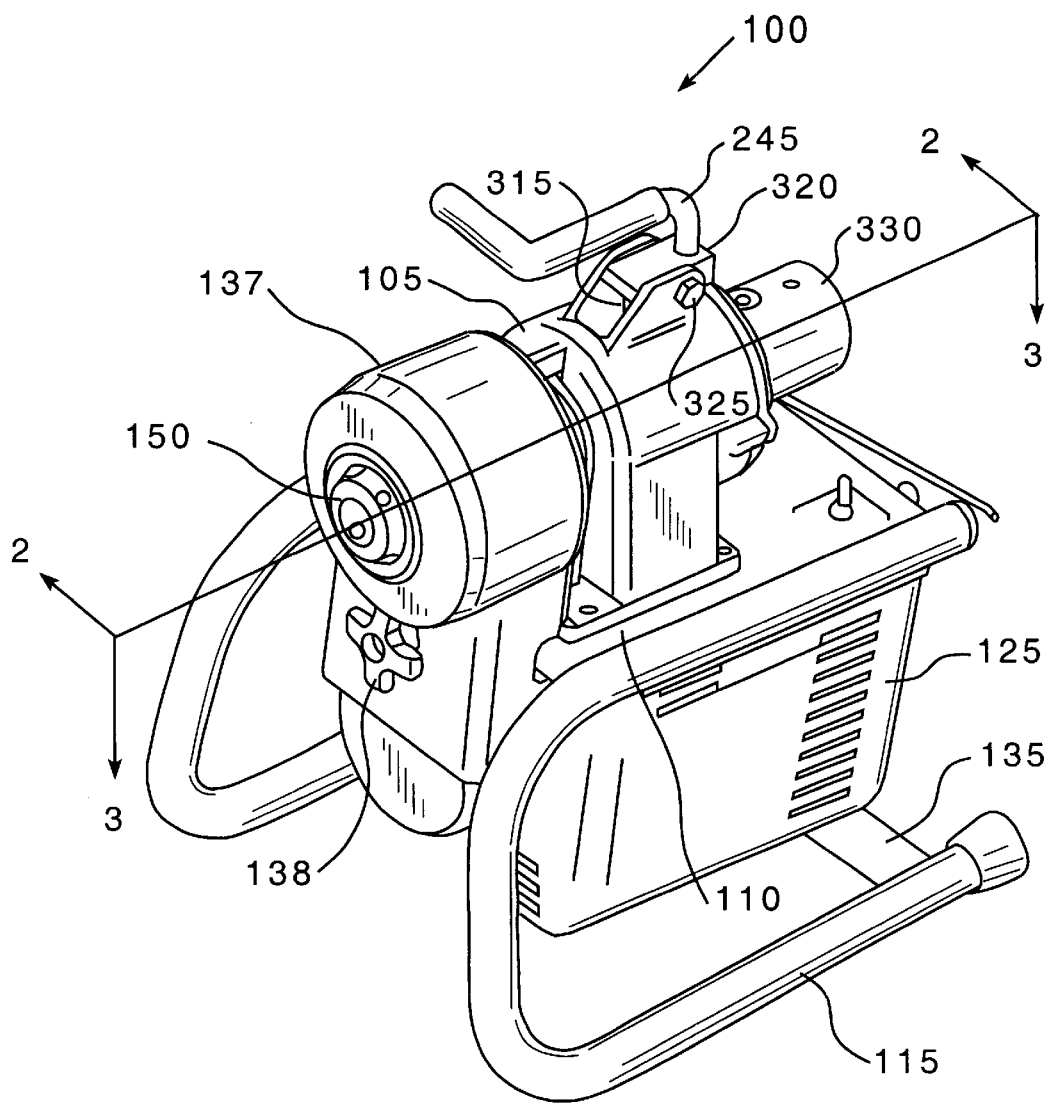
FIG. 1 is an isometric view of a drain cleaning machine according to the present invention.
Figure 2:
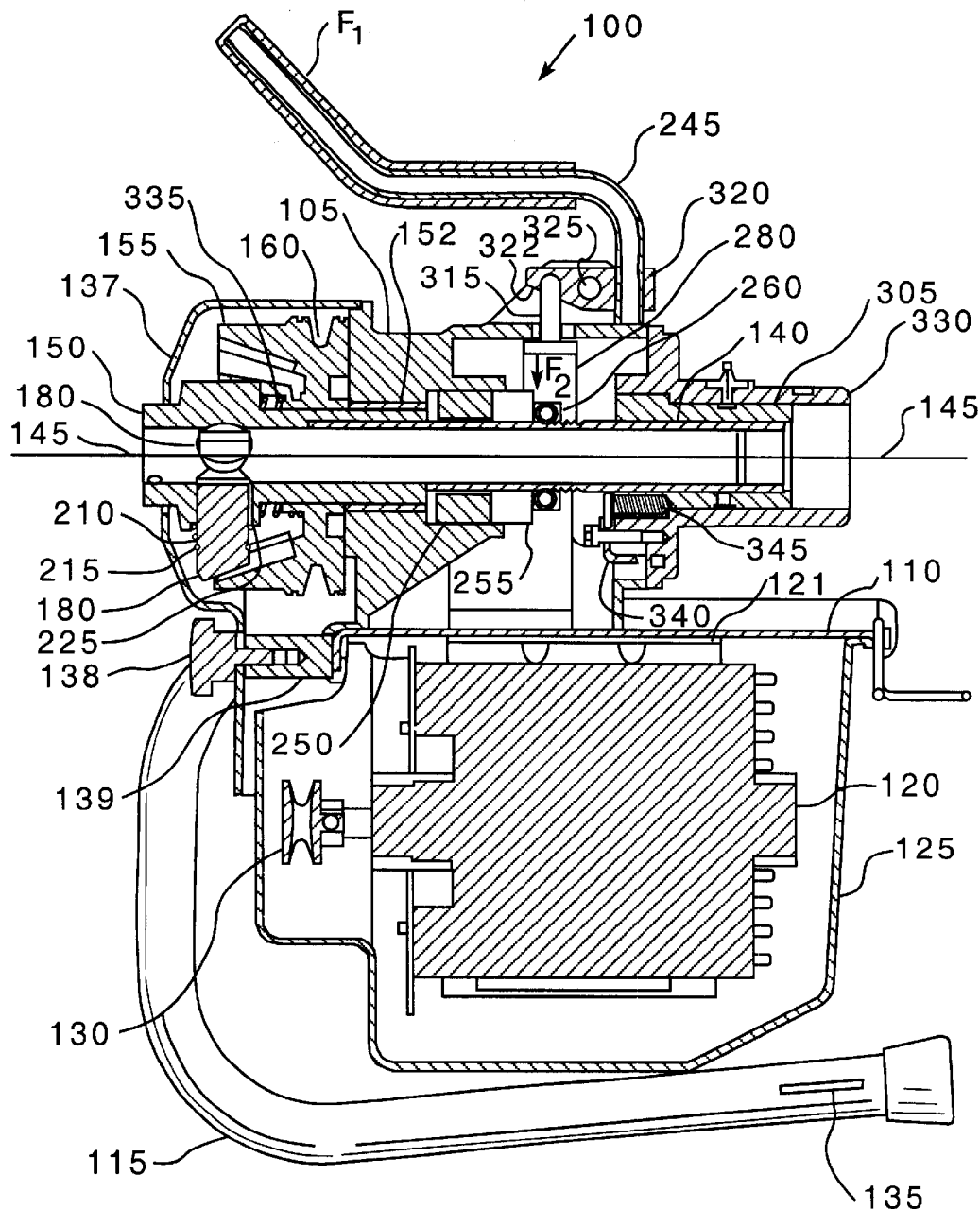
FIG. 2 is a cross-sectional diagram of the drain cleaning machine shown in FIG. 1 taken along lines 2—2 in FIG. 1.
Figure 3:
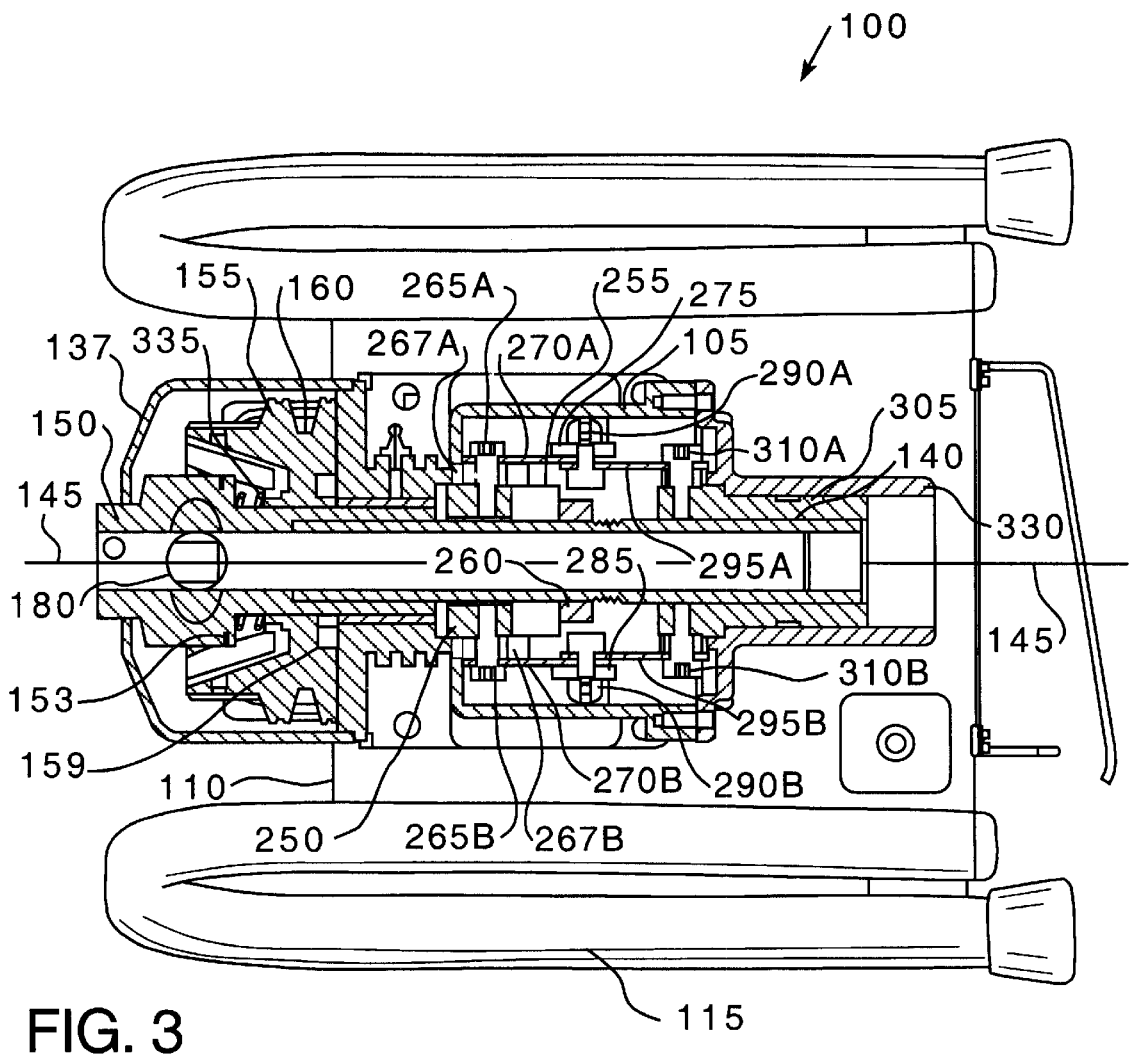
FIG. 3 is a cross-sectional diagram of the drain cleaning machine shown in FIG. 1 taken along lines 3—3 in FIG. 1.

Referring to FIG. 1, an isometric view of a drain cleaning machine 100 according to the present invention is shown. FIG. 2 is a cross-sectional diagram of drain cleaning machine 100 taken along lines 2—2 in FIG. 1, and FIG. 3 is a cross-sectional diagram of drain cleaning machine 100 taken along lines 3—3 in FIG. 1. Drain cleaning machine 100 includes housing 105 mounted to mount plate 110 by conventional means such as screws or bolts. Mount plate 110 is in turn affixed to support frame 115 by welding or other conventional means. As seen in FIG. 2, drain cleaning machine 100 includes motor assembly 120, comprising a motor, mounted on plate 121 which in turn is affixed, such as by welding, to the underside of mount plate 110. Motor assembly 120 is enclosed within motor guard 125. Rotatably attached to and driven by the motor of the motor assembly 120 is motor sheave 130. Motor sheave 130 is adapted to receive and drive a conventional belt, not shown. Preferably, the belt is a notched v-belt. Frame 115 includes brace 135 that reinforces frame 115 and protects motor guard 125 from damage in the event drain cleaning machine 100 is set down on a protrusion or the like. Drain cleaning machine 100 also includes a belt guard 137 that is removably affixed to mount plate 110 by threading retaining knob 138 into belt guard mount 139 affixed, such as by welding, to mount plate 110.

Figure 8:
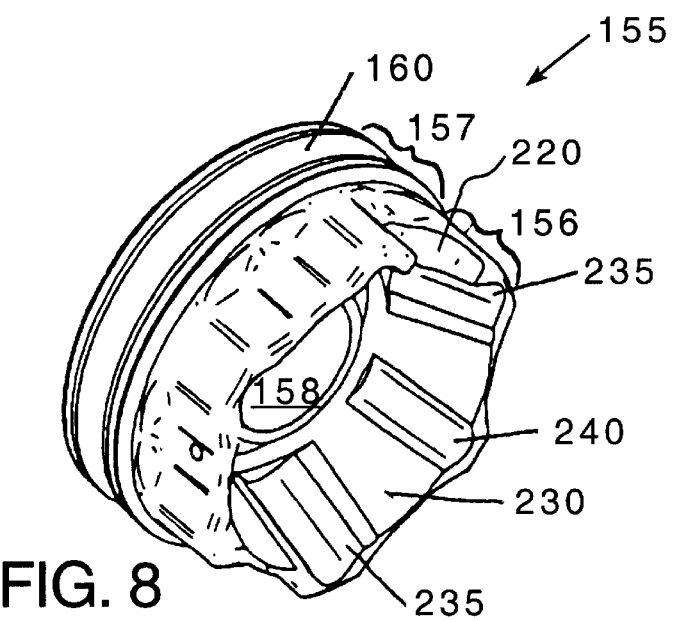
FIG. 8 is an isometric view of a cone forming a part of the drain cleaning machine according to the present invention.

Referring again to FIG. 2, shaft 140 is inserted through a bore in housing 105 and is adapted to be rotatable about axis 145 within housing 105 and axially displaceable along axis 145 within housing 105. Affixed to the front end of shaft 140 by conventional means, such as a screw or bolt, is cage 150. An isometric view of cage 150 is shown in FIG. 5. As seen in FIG. 2, the rear portion of cage 150 enters into housing 105 while the forward portion of cage 150 remains external to housing 105, and cage 150 is adapted to be rotatable about and axially displaceable along axis 145. Inserted between cage 150 and housing 105 is bearing 152. Ring 153 is inserted into groove 154 of cage 150 for altering the shape of bores 170, as shown and described more fully with respect to FIG. 5. Drain cleaning machine 100 also includes cone 155. An isometric view of cone 155 is shown in FIG. 8. Cone 155 comprises forward portion 156 and rear portion 157. Shaft 140 having cage 150 attached thereto and spring 335 placed thereon is inserted through the center bore 158 of cone 155 before being inserted within housing 105 such that, as shown in FIG. 2, cone 155 abuts the front of housing 105. Rear portion 157 of cone 155 includes ridge 160 adapted to receive the belt, not shown, that is coupled to motor sheave 130. Thus, cone 155 is adapted to be rotated about axis 145, through cooperation with roller thrust bearing 159, by motor assembly 120 through the coupling system comprising motor sheave 130, the belt, not shown, and ridge 160.

Referring to FIG. 5, cage 150 of a generally hollow cyndrical shape and includes a thickened forward portion 165 having a plurality of bores 170 extending therethrough. Bores 170 are spaced equally about the outer circumference of cage 150. In the preferred embodiment of the invention, cage 150 includes three bores. Bores 170 are each adapted to receive therein collet or jaw element 180 shown in FIGS. 6A, 6B, 6C and 6D to thereby form a chuck for engaging a drain cleaning cable, not shown, inserted through drain cleaning machine 100 through shaft 140 and cage 150. Jaw elements 180 are generally cylindrically shaped with a flat side 181. Ring 153 inserted into groove 154 of cage 150 changes the shape of bores 170 from round to round with a flat side to accommodate the shape of jaw elements 180, thereby ensuring that jaw elements 180 can only be inserted into bores 170 in one way and cannot rotate within bores 170 after insertion.

Each jaw element 180 includes top lateral surfaces 185, top central surface 190, groove 200, and cable engaging surface 205. Top lateral surfaces 185 and top central surface 190 slope from front to back. Top central surface 190 slopes at an angle of approximately 20 degrees, and preferably at an angle of 18 degrees with respect to horizontal and top lateral surfaces 185. These surfaces are preferably formed at an angle of approximately 45 degrees with respect to lateral surface 190. Cable engaging surface 205 is provided with a V-shape. Most preferably, the V-shape of cable engaging surface 205 forms an angle equal to approximately 140 degrees. As seen in FIG. 2, a spring 210 is placed onto each jaw element 180 and is held in place by retaining ring 215 inserted in groove 200. When jaw elements 180 are inserted into bores 170, springs 210 engage outer edges 225 of bores 170 and exert an upward force such that top lateral surfaces 185 of jaw elements 180 engage either of engagement surfaces 235 and 240 of the inner wall 230 of forward portion 156 of cone 155 when jaw elements 180 are aligned therewith.

Figure 4:
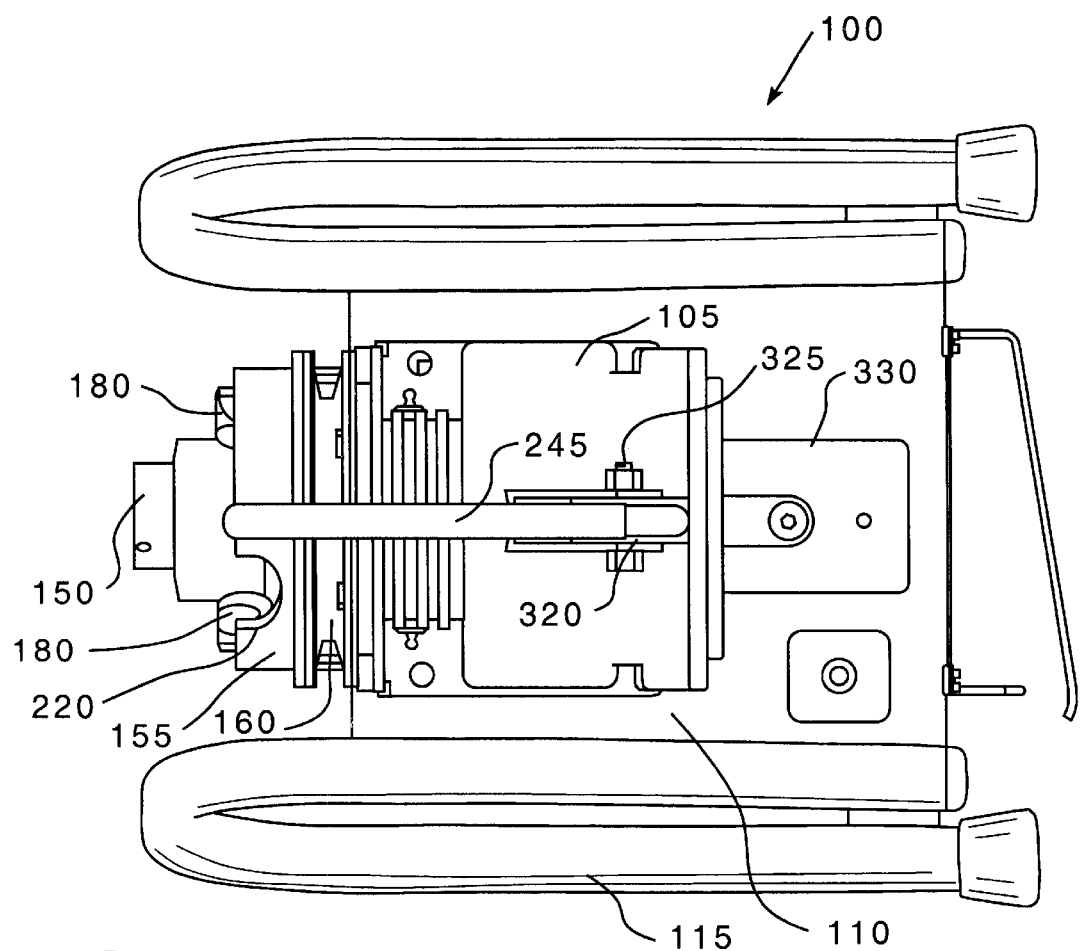
FIG. 4 is a plan view of a drain cleaning machine according to the present invention wherein the belt guard has been removed.
Figure 7:
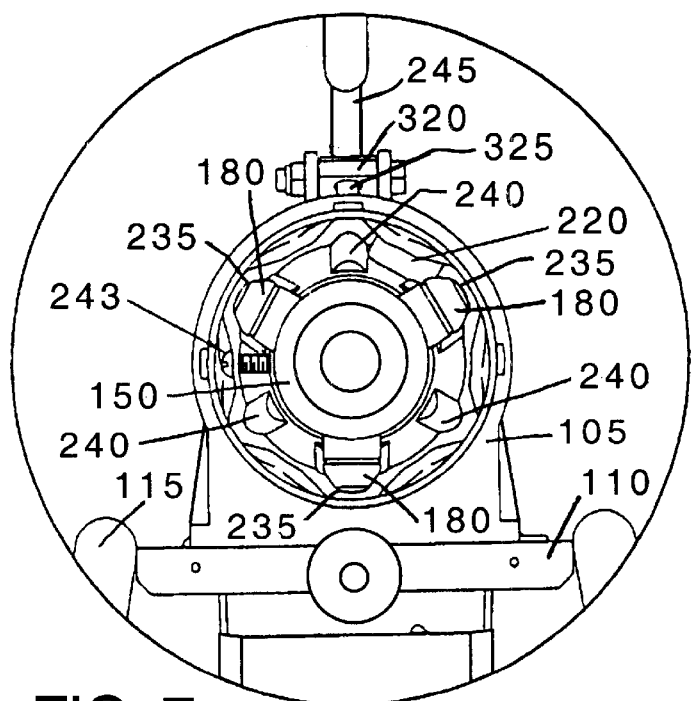
FIG. 7 is a front elevation view of a portion of the drain cleaning machine according to the present invention wherein the belt guard has been removed.

Cage 150 and cone 155 are rotatable relative to one another about axis 145. Referring to FIGS. 4 and 8, cone 155 includes notch 220. To assemble the chuck for engaging a drain cleaning cable, a first jaw element 180 having spring 210 and retaining ring 215 is inserted into a respective one of bores 170 by rotating cage 150 and cone 155 relative to one another to align the respective bore 170 with notch 220. Once a first jaw element 180 having spring 210 and retaining ring 215 is inserted into the respective bore 170, in order to rotate cage 150 and cone 155 relative to one another it will be necessary to apply a downward force to jaw element 180, radially inward with respect to axis 145, to compress spring 215 and thereby prevent top lateral surfaces 185 and top central surface 190 from engaging inner wall 230 of forward portion 156 of cone 155. This process is repeated until all of the jaw elements 180 are inserted in respective bores 170. It will be appreciated that once all of the jaw elements 180 have been so inserted into respective bores 170, a radially inward force will need to be applied to each of the jaw elements 180 in order to rotate cage 150 and cone 155 relative to one another. FIG. 4 is a top plan view of drain cleaning machine 100 with belt guard 137 removed and FIG. 7 is a partial plan view of drain cleaning machine 100 with belt guard 137 removed. Both FIGS. 4 and 7 show jaw elements 180 inserted into bores 170. It will also be appreciated that jaw elements 180 may be easily removed from the cage 150 by rotating cage 150 with respect to cone 155 to successively align the jaw elements 180 with notch 220. As a result, jaw elements 180 may be simply and easily replaced by an operator as needed due to wear or other factors. In addition, during use of drain cleaning machine 100, jaw elements 180, the interior of cage 150 and bores 170 may get contaminated with debris. Thus, the ability to easily remove jaw elements 180 from cage 150 with a minimum of disassembly or specialized tools greatly facilitates the cleaning of the interior of cage 150 and the cleaning and/or replacement of the jaw elements 180.

Figure 9:
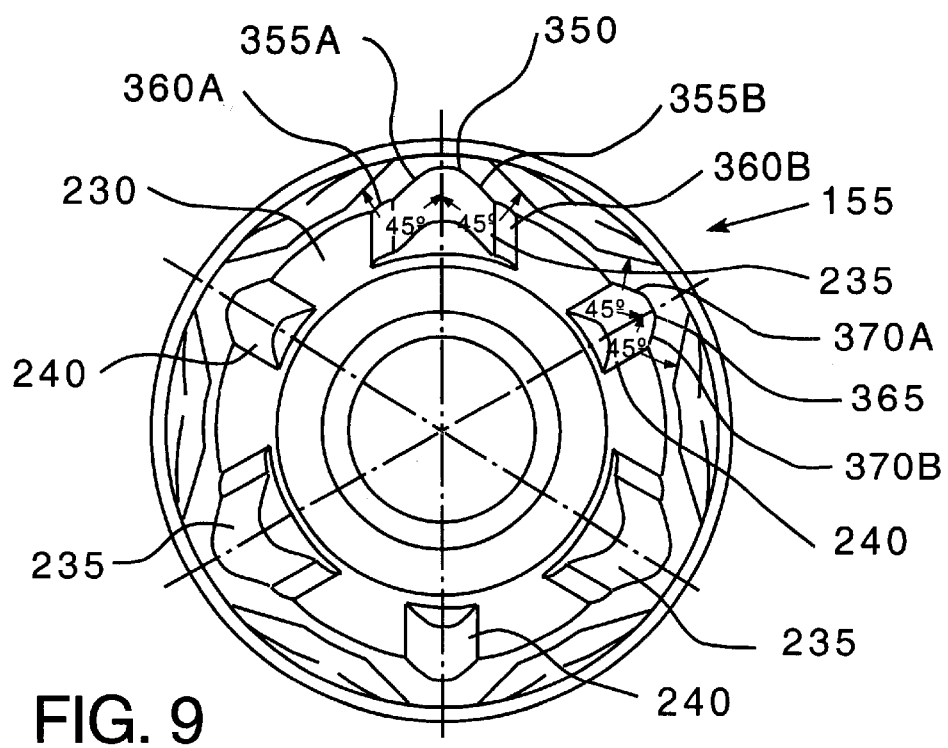
FIG. 9 is a front elevation view of the cone shown in FIG. 8.

Referrring to FIGS. 7, 8 and 9, inner wall 230 of cone 155 includes a first set of engagement surfaces 235 and a second set of engagement surfaces 240. Engagement surfaces 235 and 240 each have an inward slope or cant toward the center of cone 155. Each of engagement surfaces 235 are spaced radially from one another at a distance equal to the spacing of bores 170 about the outer circumference of cage 150. Similarly, each of engagement surfaces 240 are spaced radially from one another at a distance equal to the spacing of bores 170 about the outer circumference of cage 150.

Figure 10:
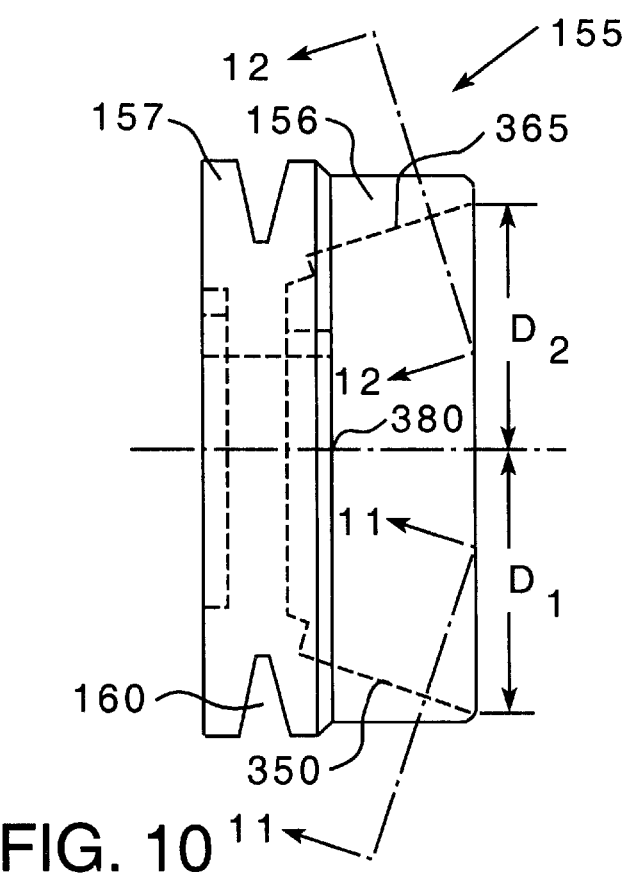
FIG. 10 is a side elevation view of the cone shown in FIGS. 8 and 9.
Figure 11:
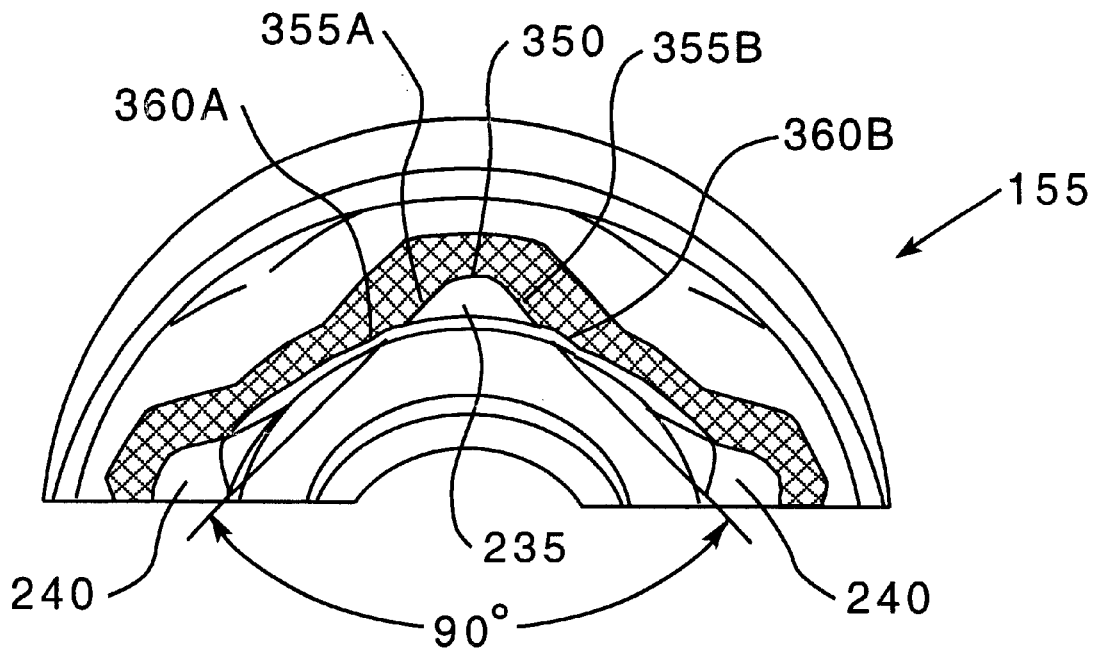
FIG. 11 is a cross-sectional diagram of the cone shown in FIGS. 8, 9 and 10 taken along line 11—11 in FIG. 10.
Figure 12:
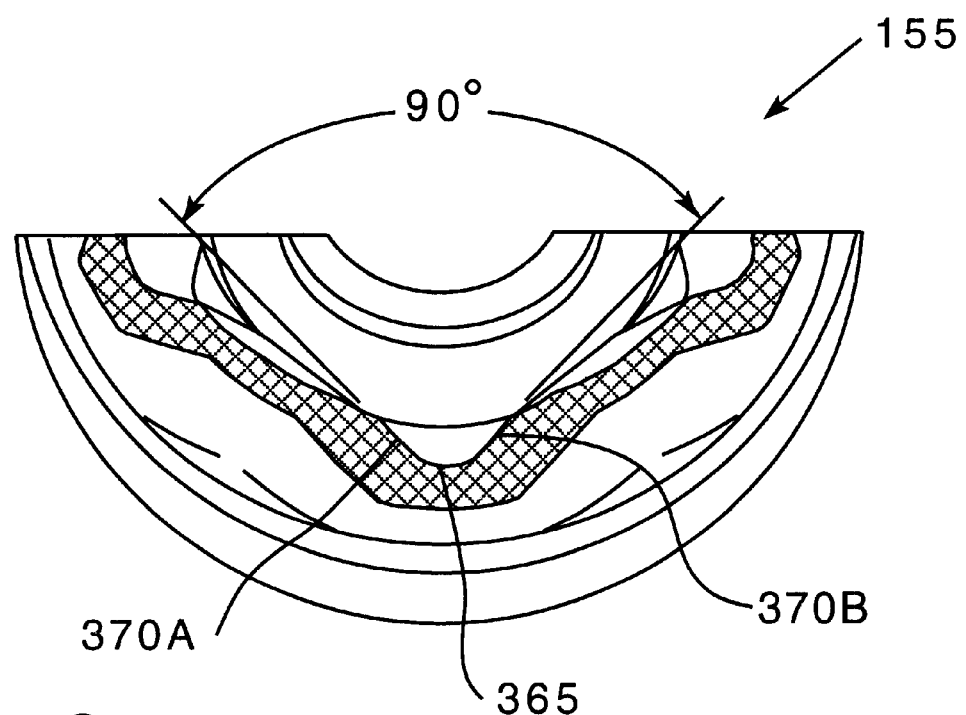
FIG. 12 is a cross-sectional diagram of the cone shown in FIGS. 8, 9 and 10 taking along lines 12—12 in FIG. 10.

Referring to FIGS. 9, 10 and 11, engagement surfaces 235 are formed in inner wall 230, such as by machining, and include an arcuate section 350 flanked on each end thereof by generally straight sections 355A and 355B. Generally straight sections 355A and 355B may be flanked by sections 360A and 360B, preferably having an arcuate shape, to provide clearance for retaining ring 215. Similarly, referring to FIGS. 9, 10 and 12, engagement surfaces 240 are formed in inner wall 230, such as by machining, and include an arcuate section 365 flanked on each end thereof by generally straight sections 370A and 370B. As seen in FIG. 10, engagement surfaces 235 and 240 slope inwardly toward bore 158 of cone 155. Arcuate section 350 forms a part of a circular section having a radius $R_1$, and arcuate section 365 forms a part of a circular section having a radius $R_2$. Referring to FIG. 10, the midpoint of arcuate section 350 at the front face of cone 155 is located a distance $D_1$ from a midpoint 380 of bore 158 and the midpoint of arcuate section 365 at the front face of cone 155 is located a distance $D_2$ from a midpoint 380 of bore 158. Preferably, $R_2$ is smaller than $R_1$ and $D_2$ is smaller than $D_1$. Most preferably, in order to accommodate both ⅝ inch cables and ⅞ inch cables, $R_1$ should be equal to approximately 0.31 inches and $D_1$ should be equal to approximately 2.269 inches and should linearly slope to approximately 1.814 inches as it approaches bore 158, and $R_2$ should be equal to approximately 0.28 inches and $D_2$ should be equal to approximately 2.139 inches and should linearly slope to approximately 1.684 inches as it approaches bore 158. As will be appreciated by one of skill in the art, changing the shape of jaw elements 180 would change the requirements for the size of $R_1$ and $R_2$. $R_1$ and $R_2$ should be sized so that arcuate sections 350 and 356 do not engage jaw elements 180.

By applying a force to each jaw element 180 directed radially inward toward axis 145, cage 150 and cone 155 may be rotated relative to one another to selectively align jaw elements 180 with engagement surfaces 235 or engagement surfaces 240 such that, when the radially inward force is no longer applied, top lateral surfaces 185 of jaw elements 180 will re-engage respective engagement surfaces 235 or engagement surfaces 240, whichever the case may be. FIG. 7 shows jaw elements 180 aligned with engagement surfaces 235. When jaw elements 180 are aligned with and engage either engagement surfaces 235 or engagement surfaces 240, cone 155 is coupled to cage 150 such that rotation of cone 155 will cause cage 150, and consequently shaft 140, to rotate about axis 145. As a result, by connecting a belt, not shown, between motor sheave 130 and cone 155, the motor of motor assembly 120 can be used to rotate cage 150 and shaft 140.

It will be appreciated that when jaw elements 180 are aligned with either engagement surfaces 235 or engagement surfaces 240 and top lateral surfaces 185 are engaged with engagement surface 235 or engagement surface 240, jaw elements 180 will be forced radially inward into the interior of cage 150 if shaft 140 and cage 150 are displaced axially along axis 145 due to the inwardly sloped or canted nature of engagement surfaces 235 and 240. It will also be appreciated that when jaw elements 180 are forced radially inward into the interior of cage 150, the cable engaging surfaces 205 of jaw elements 180, which radially surround axis 145, will approach one another and define a generally circular interior space about axis 145 through which a drain cleaning cable may pass. The further jaw elements 180 are forced radially inward into the interior of cage 150, the smaller the defined generally circular interior space will become. It will be appreciated that the generally circular interior space defined by the cable engaging surfaces 205 of jaw elements 180 may become small enough such that the cable engaging surfaces 205 of jaw elements 180 will engage an outer surface of a drain cleaning cable inserted through shaft 140 and cage 150, such that the jaw elements 180 in combination engage and grip the drain cleaning cable. In this engaged and gripped state, rotation of cone 155 and thus cage 150 and shaft 140 about axis 145 will cause the engaged and gripped drain cleaning cable to rotate about axis 145.

The degree of the slope of engagement surfaces 235 and 240 determines the distance that the jaw elements 180 travel within bores 170 when shaft 140 and cage 150 are displaced axially along axis 145. If the slope of engagement surfaces 235 and 240 is the same, then the actual distance traveled by jaw elements 180 travel when shaft 140 and cage 150 are displaced axially along axis 145 will be the same regardless of whether jaw elements are aligned with engagement surface 235 or engagement surface 240. In such a case, the extent to which jaw elements 180 extend into the interior of cage 150 when shaft 140 and cage 150 are displaced axially along axis 145 can be varied by varying the distance of the midpoints $D_1$ and $D_2$ of arcuate section 350 and 365, respectively, which, as will be appreciated by one of skill in the art, varies the beginning and ending locations of the jaw elements as they travel within the bores 170. In other words, the greater the distance D, the further that jaw elements 180 will be biased out of the interior of cage 150 by springs 210, and thus the less they will extend into the interior of cage 150 when cage 150 is axially displaced displaced along axis 145.

Referring to FIG. 7, a retaining member, such as screw 243 may be inserted into a hole provided in cone 155 in a position located centrally between an engagement surface 235 and an engagement surface 240 to act as a stop mechanism limiting the rotation of cage 150 relative to cone 155 in such a way that each jaw element 180 could only be aligned with one engagement surface 235 or an adjacent engagement surface 240. Screw 243 would also prevent cage 150 from being rotated relative to cone 155 in a manner that would align any of the jaw elements 180 with notch 220. Thus, it will be necessary to remove screw 243 so as to enable full rotation of cage 150 with respect to cone 155 in order to align the jaw elements 180 with notch 220 and remove the jaw elements from cage 150.

Axial displacement of shaft 140 and cage 150 along axis 145 may be affected and controlled by handle 245. In particular, referring to FIGS. 2 and 3, fitted onto shaft 140 are slide 250 and ball thrust bearing 255. Shaft 140, and ball thrust bearing 255 are adapted to rotate relative to slide 250. Threaded onto shaft 140 is collar 260. As seen in FIGS. 2 and 3, collar 260 abuts ball thrust bearing 255. Affixed to opposite sides of slide 250 by screws 265A and 256B and spacers 267A and 267B, or other conventional means, are first front link 270A and second front link 270B, each comprising of generally flat elongate member. First front link 270A is connected at the opposite end thereof to a first end 275 of yoke 280 by screw 290A or other conventional means, and second front link 270B is connected at the opposite end thereof to second end 285 of yoke 280 by screw 290B or other conventional means. Also connected to first end 275 of yoke 280 by screw 290A is first back link 295A, and also connected to second end 285 of yoke 280 by screw 290B is second back link 295B. First back link 295A and second back link 295B each also comprise generally flat elongate members. The opposite ends of first back link 295A and second back link 295B are affixed to opposite sides of sleeve 305 by screws 310A and 310B, respectively, or by other conventional means. Although yoke 280 is shown in the Figures, it will be appreciated that other forms of linkages such as a single arm may be used. Sleeve 305 is adapted to slide axially along axis 145 within door 330. The forward motion of sleeve 305 is limited by stop 340 and spring 345, and the rearward motion of sleeve 305 is limited by a shoulder provided on sleeve 305. Shaft 140 is adapted to be inserted within sleeve 305, and is adapted to be axially displaced along and rotated about axis 145 within sleeve 305. Coupled to yoke 280 is push rod 315. Push rod 315 extends from the inside of housing 105 through a hole in housing 105 and is adapted to move up and down within the hole in housing 105. Affixed to handle 245 adjacent housing 105 is pivot block 320. Pivot block 320 is coupled to and adapted to rotate about bolt 325 affixed to housing 105. Pivot block 320 is adapted to receive in a blind, spherical hole in the bottom thereof the spherical top of push rod 315 such that the application of a force $F_1$ shown in FIG. 2 to handle 245 causes pivot block 320 to rotate about bolt 325 and apply a downward force $F_2$ shown in FIG. 2 to push rod 315 and in turn to yoke 280. It will be appreciated that through the interaction of first front link 270A and second front link 270B, slide 250, ball thrust bearing 255 and collar 260, the downward force on yoke 280 causes shaft 140 and cage 150 to be axially displaced within housing 105 and sleeve 305 along axis 145 in a direction away from belt guard 137 and toward door 330, which is placed over sleeve 305 and affixed to housing 105. In addition, sleeve 305 will be axially displaced within housing 105 in a direction toward belt guard 137. Displacing cage 150 axially along axis 145 toward door 330 causes spring 335 inserted between cage 150 and cone 155 to be compressed. When handle 245 is released, i.e., when force $F_1$ is removed therefrom, the resulting decompression of spring 335 causes cage 150 and shaft 140 to be axially displaced along axis 145 toward belt guard 137 and away from door 330.

Excessive play in handle 245 caused by excessive clearance between the top of push rod 315 and the bottom of pivot block 320, which results in a decrease in the useable stroke of handle 245, may prevent the jaw elements 180 from securely gripping undersized cables. In an alternate embodiment, such excessive play can be eliminated by providing a tension adjustment member (not shown), such as a screw, in pivot block 320 that is threaded through the top thereof and that is aligned with the hole therein for receiving push rod 315. The degree to which the tension adjustment member is threaded through pivot block 320 allows a user to selectively increase and decrease the clearance between the top of push rod 315 and the bottom of pivot block 320 and thereby control the play in handle 245.

What is claimed is:

1. A drain cleaning machine, comprising:

a housing having a longitudinal axis, said housing adapted to receive a cable along said longitudinal axis;

a cage member having a first end and second end, said first end of said cage member having an axial bore therethrough and a plurality of holes located radially about a circumference thereof, said holes extending through an outer wall of said cage member, said second end of said cage member being inserted within said housing such that said axial bore corresponds with said longitudinal axis, said cage member being rotatable about said longitudinal axis and being adapted to receive said cable therethrough;

a plurality of jaw elements, each of said jaw elements being inserted into and displaceable within one of said holes;

a cone member surrounding said first end of said cage member, said cone member being rotatable about said longitudinal axis, said cone member engaging each of said jaw elements and displacing said jaw elements radially inward within said holes when said cage member and said cone member are axially displaced relative to one another along said longitudinal axis; and a motor coupled to said cone member for rotating said cone member, wherein rotation of said cone member causes rotation of said cage member;

wherein said jaw elements are adapted to engage and grip said cable such that rotation of said cage member causes rotation of said cable about said longitudinal axis.

2. A drain cleaning machine according to claim 1, said cage member being axially displaceable along said longitudinal axis, said drain cleaning machine further comprising means for axially displacing said cage member along said longitudinal axis.

3. A drain cleaning machine according to claim 2, said cage member being axially displaceable along said longitudinal axis, said drain cleaning further comprising:
  a shaft within said housing, said shaft being coupled to said cage member and being axially displaceable along said longitudinal axis;
  a linkage coupled to said shaft; and
  a handle coupled to said linkage, wherein manipulation of said handle causes displacement of said linkage and wherein displacement of said linkage causes axial displacement of said shaft and said cage member along said longitudinal axis.

4. A drain cleaning machine according to claim 3, further comprising a push rod attached to said yoke and a pivot block attached to said handle, said push rod being received in a hole provided in said pivot block.

5. A drain cleaning machine according to claim 4, further comprising a tension adjustment member threaded through the top of said pivot block, said tension adjustment member being aligned with said hole in said pivot block.

6. A drain cleaning machine according to claim 3, said linkage comprising a yoke.

7. A drain cleaning machine according to claim 1, wherein said cone member includes a plurality of first engagement surfaces and a plurality of second engagement surfaces, and wherein said jaw elements are selectively alignable with said first engagement surfaces and said second engagement surfaces by rotating said cage member with respect to said cone member.

8. A drain cleaning machine according to claim 7, wherein said holes are spaced equally about said circumference of said cage member, wherein said first engagement surfaces are spaced equally about a perimeter of said cone member, and wherein said second engagement surfaces are spaced equally about said perimeter of said cone member.

9. A drain cleaning machine according to claim 7, wherein each of said jaw elements has a sloped top surface, said sloped top surfaces engaging corresponding ones of said first engagement surfaces when said jaw elements are aligned with said first engagement surfaces and engaging corresponding ones of said second engagement surfaces when said jaw elements are aligned with said second engagement surfaces, and wherein said first engagement surfaces and said second engagement surfaces have an inward cant.

10. A drain cleaning machine according to claim 9, wherein said first engagement surfaces each comprise a first arcuate section and said second engagement surfaces each comprise a second arcuate section, said cone member having an axial bore therethrough, wherein said first arcuate sections have a midpoint at a front face of said cone member located a first distance from a center of said axial bore and said second arcuate sections have a midpoint at a front face of said cone member located a second distance from a center of said axial bore.

11. A drain cleaning machine according to claim 10, wherein said first distance is larger than said second distance.

12. A drain cleaning machine according to claim 7, said cone member having a removable stop member, said stop member limiting rotation of said cage member with respect to said cone member, wherein when each of said jaw elements is inserted into one of said holes, each jaw element may only be aligned with one of said first engagement surfaces or an adjacent one of said second engagement surfaces.

13. A drain cleaning machine according to claim 12, wherein said cone member includes a notch located between one of said first engagement surfaces and one of said second engagement surfaces, said notch being sized to allow said jaw elements to be inserted into said holes when said holes are aligned with said notch, and wherein when each of said jaw elements is inserted into one of said holes and said removable stop member is in place, said jaw elements cannot be aligned with said notch.

14. A drain cleaning machine according to claim 7, wherein each of said jaw elements has a top surface, said top surfaces engaging corresponding ones of said first engagement surfaces when said jaw elements are aligned with said first engagement surfaces and engaging corresponding ones of said second engagement surfaces when said jaw elements are aligned with said second engagement surfaces, and wherein said jaw elements are displaced a first distance within said axial bore of said cage member when engaging said first engagement surfaces and a second distance within said axial bore of said cage member when engaging said second engagement surfaces.

15. A drain cleaning machine according to claim 12, wherein said cone member includes a plurality of inwardly canted engagement surfaces, and wherein each of said jaw elements have a sloped top surface, said sloped top surfaces engaging corresponding ones of said engagement surfaces.

16. A drain cleaning machine according to claim 1, wherein said cone member includes a notch, said notch being sized to allow said jaw elements to be inserted into said holes when said holes are aligned with said notch.

17. A drain cleaning machine according to claim 1, wherein said holes are spaced equally about said circumference of said cage member.

18. A drain cleaning apparatus according to claim 1, further comprising a motor sheave driven by said motor and a belt connected between said motor sheave and said cone member.

19. A drain cleaning machine according to claim 18, further comprising a guard member removably enclosing said belt, said front end of said cage member and said cone member.

20. A drain cleaning machine according to claim 1, said jaw elements each having a V-shaped cable engaging surface.

21. A drain cleaning machine according to claim 2, further comprising a biasing clement coupled to each of said jaw elements, said biasing elements biasing said jaw elements radially outwardly within said holes.

22. A drain cleaning machine according to claim 21, wherein said biasing element comprises a spring.

* * * * *

UNITED STATES PATENT AND TRADEMARK OFFICE
CERTIFICATE OF CORRECTION

PATENT NO. : 6,546,582 B2  Page 1 of 1
DATED : April 15, 2003
INVENTOR(S) : Lee H. Silverman It is certified that error appears in the above-identified patent and that said Letters Patent is hereby corrected as shown below:

Column 2,
Line 4, after "surfaces" insert -- , with the jaw elements being selectively alignable with the first engagement surfaces --.

Column 7,
Line 1, delete "distance" and insert -- distances --.

Column 9,
Line 1, delete "claim 2" and insert -- claim 1 --.

Column 10,
Line 29, delete "claim 12" and insert -- claim 1 --.

Signed and Sealed this

Twenty-first Day of October, 2003

JAMES E. ROGAN
*Director of the United States Patent and Trademark Office*